United States Patent
Chang

(10) Patent No.: US 6,752,124 B1
(45) Date of Patent: Jun. 22, 2004

(54) EDDY FLOW GENERATOR TO INCREASE HORSEPOWER OF AN INTERNAL COMBUSTION ENGINE

(76) Inventor: Chin-Feng Chang, No. 126, Tungan Rd., Neipu Hsiang, Pingtung Hsien (TW)

( * ) Notice: Subject to any disclaimer, the term of this patent is extended or adjusted under 35 U.S.C. 154(b) by 0 days.

(21) Appl. No.: 10/426,886

(22) Filed: Apr. 30, 2003

(51) Int. Cl.$^7$ ................................................ F02B 31/00
(52) U.S. Cl. ...................................... 123/306; 123/308
(58) Field of Search ................................ 123/306, 308, 123/309, 429, 432

(56) References Cited

U.S. PATENT DOCUMENTS

| | | | | |
|---|---|---|---|---|
| 4,417,562 A | * | 11/1983 | Dalke | 123/592 |
| 4,428,336 A | * | 1/1984 | Dye et al. | 123/188.7 |
| 4,744,340 A | * | 5/1988 | Kirby | 123/188.7 |
| 5,595,157 A | * | 1/1997 | Siew et al. | 123/306 |
| 6,158,412 A | * | 12/2000 | Kim | 123/306 |

* cited by examiner

*Primary Examiner*—Bibhu Mohanty
(74) *Attorney, Agent, or Firm*—Alan D. Kamrath; Nikolai & Mersereau, P.A.

(57) ABSTRACT

An eddy flow generator includes a base adapted to be located at a joint between the fuel injector and the intake manifold and multiple passages each being adapted to correspond to and communicate with one of multiple air paths of the intake manifold. Each passage has multiple spirally formed blades to direct air flow in a spiral pattern. Therefore, air coming from the intake manifold is able to fully mix with fuel via movement of the air in a spiral pattern.

12 Claims, 3 Drawing Sheets

EDDY FLOW GENERATOR TO INCREASE HORSEPOWER OF AN INTERNAL COMBUSTION ENGINE

BACKGROUND OF THE INVENTION

1. Field of the Invention

The present invention relates to an eddy flow generator, and more particularly to a horsepower booster for an internal combustion engine by changing an air flow pattern into the combustion chamber so as to increase a mixture between air and fuel.

2. Description of Related Art

Superchargers, turbos, air blowers and many other designs are used for internal combustion engines to boost horsepower output of a variety of engines. However, all these auxiliary horsepower boosting designs are either too far away from the combustion chamber or too complex and expensive to mount on the engines. If the auxiliary horsepower booster is mounted too far away from the combustion chamber, the strength of air flow into the combustion chamber is decreased so that only minor change in the horsepower output can be observed.

To overcome the shortcomings, the present invention tends to provide an improved eddy flow generator to mitigate the aforementioned problems.

SUMMARY OF THE INVENTION

The primary objective of the present invention is to provide an improved eddy flow generator which is close to the combustion chamber and inexpensive such that the effectiveness of increasing horsepower output can be easily observed.

Another objective of the present invention is to provide an improved eddy flow generator having a stop integrally formed with the eddy flow generator to correspond to a fuel injector so that before entering the combustion chamber, the fuel is atomized to completely mix with incoming air.

Other objects, advantages and novel features of the invention will become more apparent from the following detailed description when taken in conjunction with the accompanying drawings.

DETAILED DESCRIPTION OF THE PREFERRED EMBODIMENT

Figure 1:
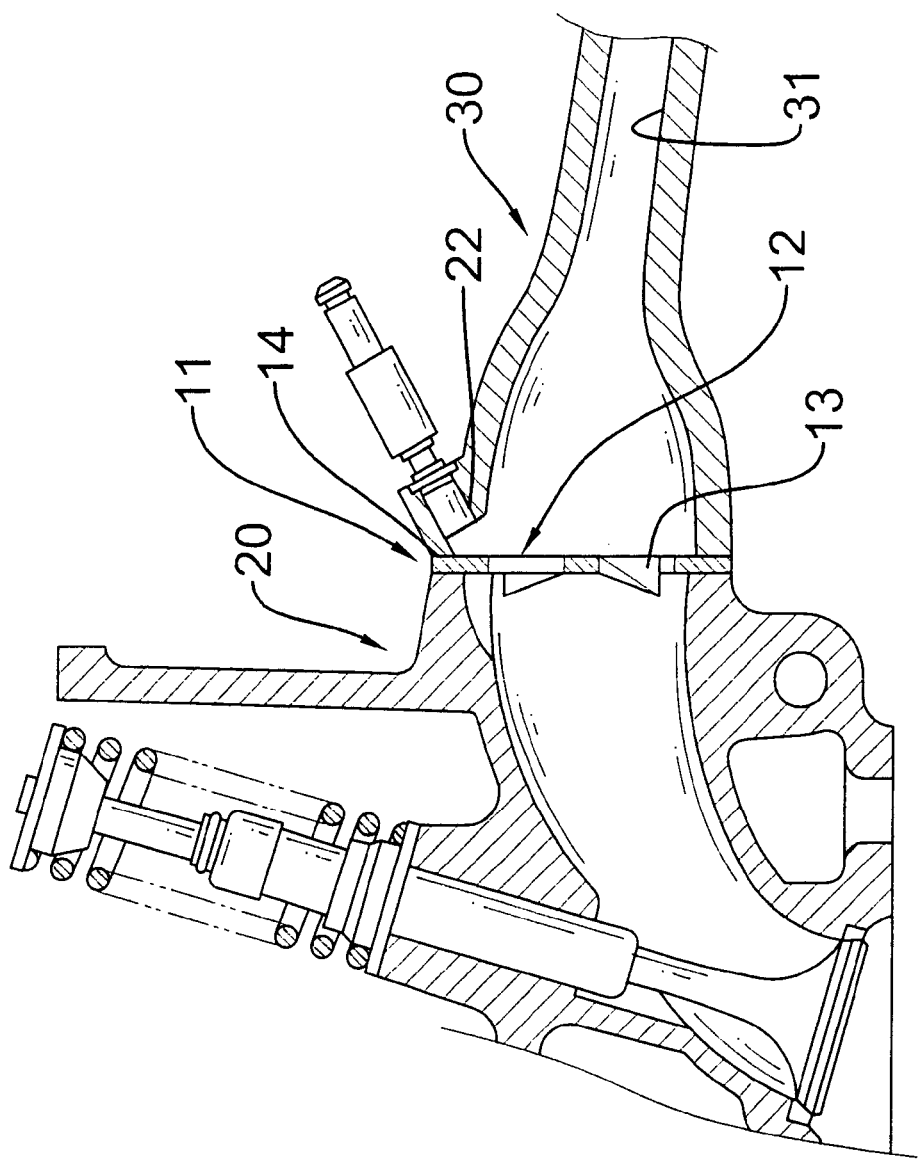
FIG. 1 is a cross sectional view of an internal combustion engine mounted with the eddy flow generator of the present invention.
Figure 2:
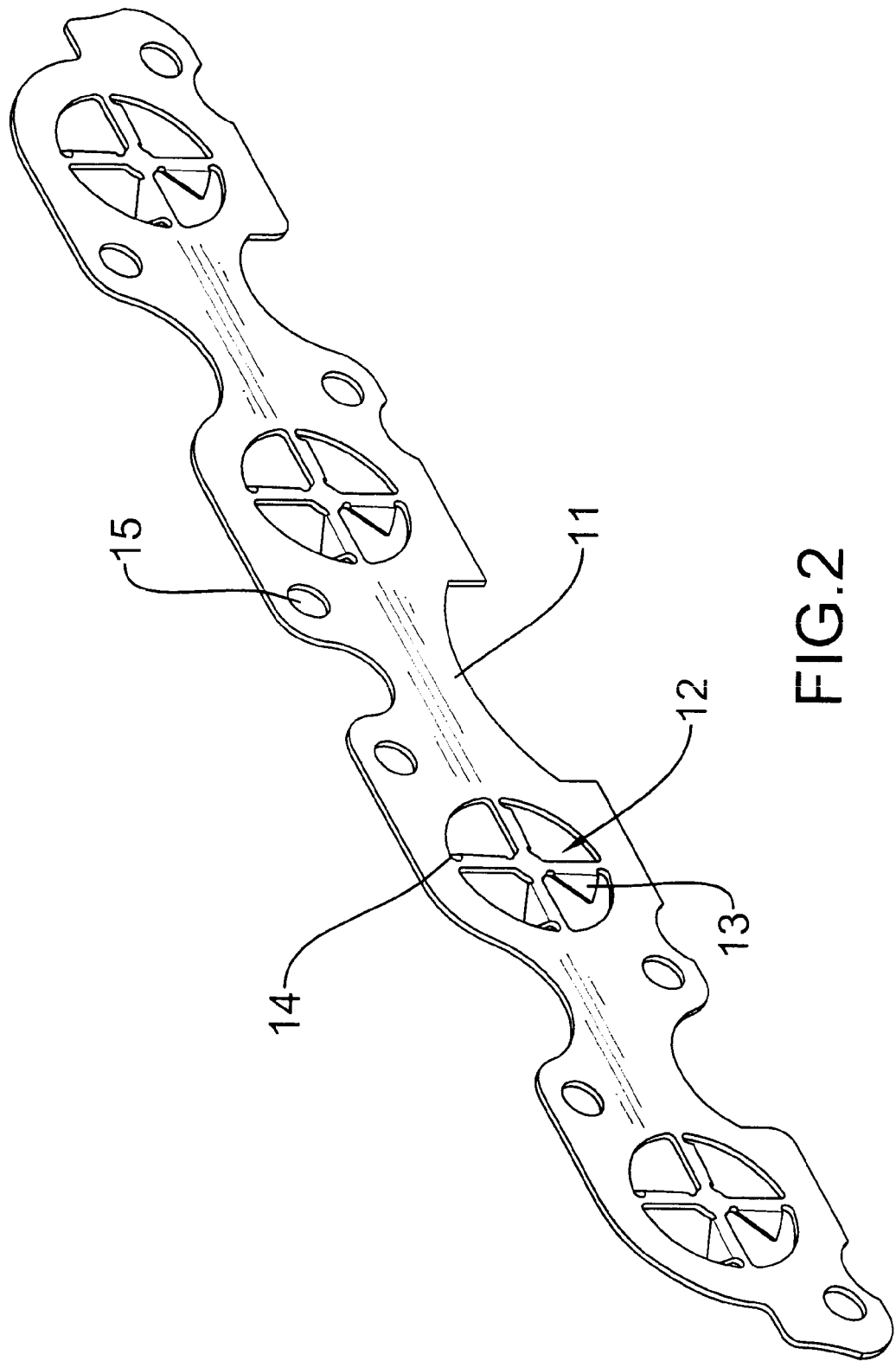
FIG. 2 is a perspective view of the eddy flow generator of the present invention.

With reference to FIGS. 1 and 2, the eddy flow generator in accordance with the present invention includes a sheet of material formed as an elongated base (11) positioned at a joint of an intake manifold (30) and a fuel injector (22) of an internal combustion engine (20).

The eddy flow generator of the present invention further has multiple passages (12) defined through the base (11) to correspond to and communicate with air paths (31) of the intake manifold (30), a stop (14) formed on a top portion of the base (11) and holes (15) defined around each of the passages (12). Each passage (12) has multiple spirally formed blades (13) respectively orientated into or away from the internal combustion engine (20). That is, the orientation of the blades (13) is either consistent to the direction of the air flow in the engine or opposite to the air flow direction in the engine (20). In the preferred embodiment shown in the accompanied drawings, the orientation of the blades (13) is consistent to the air flow direction.

Figure 3:
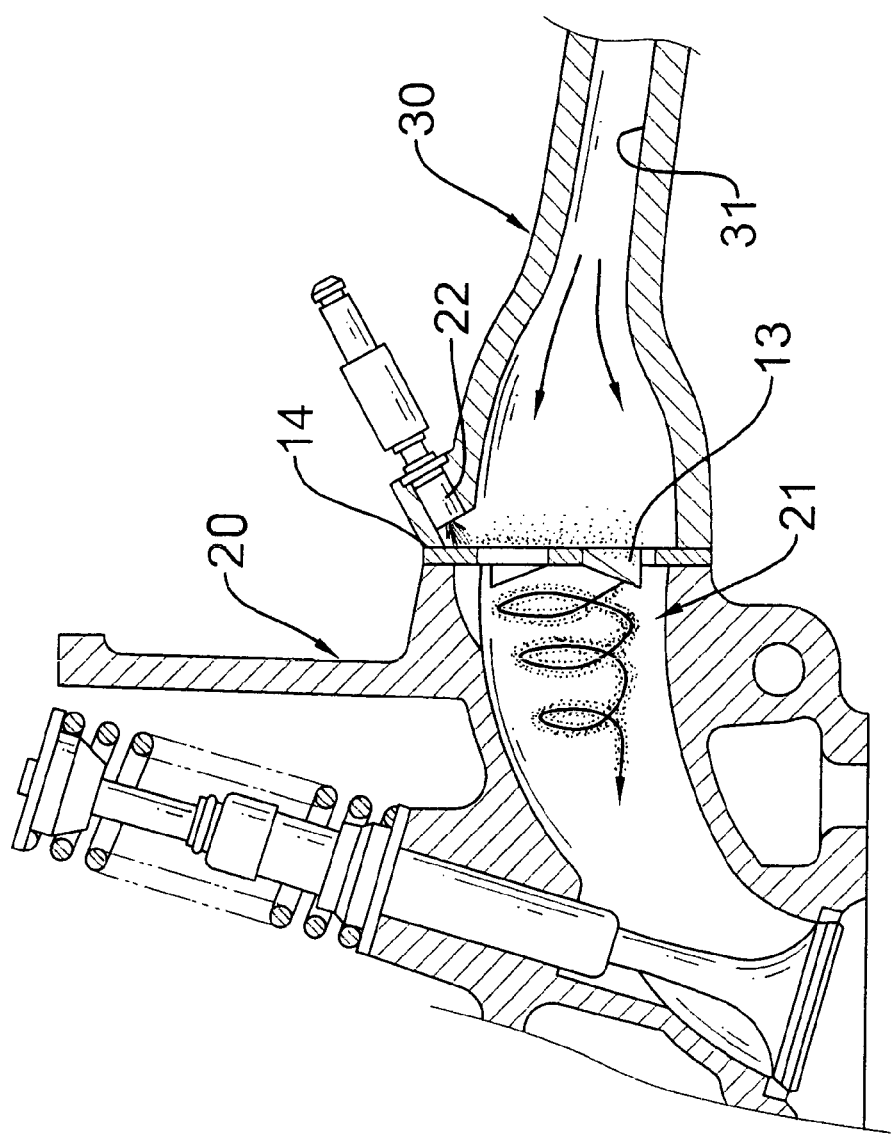
FIG. 3 is a schematic view showing that when the air is sucked into the combustion chamber, due to the spirally formed blades of the eddy flow generator, a full mixture of air and fuel is accomplished.

With reference to FIG. 3, after the eddy flow generator of the present invention is mounted at the joint of the fuel injector (22) and the intake manifold (30) to function as a bushing, the stop (14) is in front of the fuel injector (22) so that whenever there is an injection of fuel into the combustion chamber (21) from the fuel injector (22), the fuel is stopped by the stop (14) and thus atomized. At the time when the fuel is atomized, the vacuum suction force in the combustion chamber (21) attracts air outside the engine (20) to flow into the combustion chamber (21) via the intake manifold (30). Thus when the incoming air in the intake manifold (30) passes through the passages (12), the atomized fuel is mixed with the incoming air. Furthermore, due to the spirally formed blades (13) in each of the passages (12), the air flow pattern in the combustion chamber (21) is changed accordingly. The spiral path of the air and fuel increases the full and optimum mixture between the air and the fuel such that the engine horsepower generated from the explosion of the air-fuel mixture is increased.

In summary, the eddy flow generator of the present invention has the following advantages:

① simple in structure
② easy to mount on the engine
③ does not draw any power from the engine
④ constant, yet steady horsepower output
⑤ increase in engine efficiency, and
⑥ reduction of air pollution due to complete mixture between air and fuel It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An eddy flow generator adapted to be mounted at a joint between a fuel injector and an intake manifold of an internal combustion engine, the eddy flow generator comprising:

a base having a first side face, an opposite side face and a periphery, with the base adapted to be located at the joint between the fuel injector and the intake manifold with the fuel injector abutting with the first side face and the intake manifold abutting with the opposite side face;

multiple passages for receiving air and fuel and each defined in the base extending between the first and second side faces and spaced inwardly of the periphery, with each of the multiple passages adapted to correspond to and communicate with one of multiple air paths of the intake manifold, each passage having multiple spirally formed blades integrally formed on one of the side faces of the base and extending outward of the one of the side faces to direct air flow in a spiral pattern, whereby the air coming from the intake manifold is able to fully mix with the fuel via movement of the air flow in the spiral pattern.

2. The eddy flow generator as claimed in claim 1 further comprising a stop formed on a top portion of the base, the stop being adapted to correspond to the fuel injector so that the fuel is able to be atomized prior to entrance of a combustion chamber of the engine.

3. The eddy flow generator as claimed in claim 1, wherein an orientation of the blades is adapted to be consistent to an air flow direction.

4. The eddy flow generator as claimed in claim 2, wherein an orientation of the blades is adapted to be consistent to an air flow direction.

5. The eddy flow generator as claimed in claim 1, wherein an orientation of the blades is adapted to be opposite to an air flow direction.

6. The eddy flow generator as claimed in claim 2, wherein an orientation of the blades is adapted to be opposite to an air flow direction.

7. Apparatus for an internal combustion engine comprising:

a fuel injector;

an intake manifold; and an eddy flow generator comprising:

a base located at a joint between the fuel injector and the intake manifold;

multiple passages defined in the base and each corresponding to and communicating with one of multiple air paths of the intake manifold, each passage having multiple spirally formed blades to direct air flow in a spiral pattern, whereby air coming from the intake manifold is able to filly mix with fuel via movement of the air flow in the spiral pattern.

8. The apparatus as claimed in claim 7 further comprising a stop formed on a top portion of the base, the stop being adapted to correspond to the fuel injector so that the fuel is able to be atomized prior to entrance of a combustion chamber of the internal combustion engine.

9. The apparatus as claimed in claim 8, wherein an orientation of the blades is adapted to be consistent to an air flow direction.

10. The apparatus as claimed in claim 8, wherein an orientation of the blades is adapted to be opposite to an air flow direction.

11. The apparatus as claimed in claim 7, wherein an orientation of the blades is adapted to be consistent to an air flow direction.

12. The apparatus as claimed in claim 7, wherein an orientation of the blades is adapted to be opposite to an air flow direction.

* * * * *